(12) United States Patent
Al-Khulaifi

(10) Patent No.: US 9,408,452 B1
(45) Date of Patent: Aug. 9, 2016

(54) ROBOTIC HAIR DRYER HOLDER SYSTEM WITH TRACKING

(71) Applicant: Khaled A. M. A. A. Al-Khulaifi, Safat (KW)

(72) Inventor: Khaled A. M. A. A. Al-Khulaifi, Safat (KW)

( * ) Notice: Subject to any disclaimer, the term of this patent is extended or adjusted under 35 U.S.C. 154(b) by 0 days.

(21) Appl. No.: 14/946,734

(22) Filed: Nov. 19, 2015

(51) Int. Cl.
| | |
|---|---|
| *A45D 20/00* | (2006.01) |
| *A45D 20/12* | (2006.01) |
| *A46B 15/00* | (2006.01) |
| *A46B 5/00* | (2006.01) |
| *B25J 9/00* | (2006.01) |
| *B25J 9/06* | (2006.01) |
| *B25J 9/16* | (2006.01) |
| *F16B 47/00* | (2006.01) |
| *F16M 13/02* | (2006.01) |
| *B25J 9/12* | (2006.01) |
| *B25J 13/06* | (2006.01) |
| *B25J 19/00* | (2006.01) |

(52) U.S. Cl.
CPC .............. *A45D 20/12* (2013.01); *A46B 5/0095* (2013.01); *A46B 15/0002* (2013.01); *B25J 9/0003* (2013.01); *B25J 9/0009* (2013.01); *B25J 9/06* (2013.01); *B25J 9/12* (2013.01); *B25J 9/1676* (2013.01); *B25J 9/1694* (2013.01); *B25J 13/06* (2013.01); *B25J 19/0025* (2013.01); *F16B 47/00* (2013.01); *F16M 13/022* (2013.01); *A45D 2020/126* (2013.01); *Y10S 901/10* (2013.01)

(58) Field of Classification Search
CPC .............. F26B 3/00; F26B 5/00; F26B 21/00; A45D 20/00; A45D 20/08; A45D 20/28
USPC ........... 34/97, 98, 99; 132/112; 392/384, 385; D28/17, 18
See application file for complete search history.

(56) References Cited

U.S. PATENT DOCUMENTS

| | | | | |
|---|---|---|---|---|
| 4,258,731 A * | 3/1981 | Tsujimoto | .............. | A45D 20/20 132/212 |
| 4,453,695 A * | 6/1984 | Sennott | ................... | A45D 20/12 248/278.1 |
| 4,691,451 A * | 9/1987 | Giorgis | .................. | A45D 20/08 34/68 |
| 4,910,382 A * | 3/1990 | Kakuya | .................. | A45D 20/20 219/222 |
| 5,174,531 A | 12/1992 | Perakis | | |
| 5,613,305 A * | 3/1997 | Narrin | ..................... | A45D 20/12 34/90 |
| 5,640,781 A * | 6/1997 | Carson | ................... | A45D 20/16 132/229 |
| 5,642,570 A * | 7/1997 | Lee | ......................... | A45D 19/16 34/98 |
| 5,832,624 A * | 11/1998 | Narrin | ..................... | A45D 20/12 34/97 |
| 5,970,622 A | 10/1999 | Bahman | | |
| 6,138,376 A * | 10/2000 | Garfinkel | ............... | A45D 2/001 34/101 |
| 6,199,805 B1 * | 3/2001 | Pena | ....................... | A45D 20/12 248/125.8 |

(Continued)

FOREIGN PATENT DOCUMENTS

| | | | | | |
|---|---|---|---|---|---|
| FR | | 2950516 A3 * | 4/2011 | .............. | A47G 1/02 |
| FR | EP | 2452584 A1 * | 5/2012 | ............. | A45D 20/12 |

(Continued)

*Primary Examiner* — Stephen M Gravini
(74) *Attorney, Agent, or Firm* — Richard C. Litman

(57) ABSTRACT

The robotic hair dryer holder system with tracking includes a robotic arm mounted to a base and a brush. The base mounts to a surface of a desired location for placement of the robotic arm. The robotic arm includes a plurality of articulating members that rotate and pivot with respect to each other. A hair dryer holder is attached to a distal end of the robotic arm and includes a motion detector. The hair dryer holder selectively holds a hair dryer, and the motion detector tracks a sensor element on the brush, causing the robotic arm to follow movements of the brush to dry a user's hair.

14 Claims, 6 Drawing Sheets

(56) References Cited

U.S. PATENT DOCUMENTS

| | | | |
|---|---|---|---|
| 6,205,679 B1 * | 3/2001 | Rodway | F26B 21/001 34/487 |
| 6,784,775 B2 * | 8/2004 | Mandell | A45D 20/12 335/206 |
| D568,708 S * | 5/2008 | Petruccelli | D8/73 |
| 8,151,481 B2 | 4/2012 | Perez, Jr. | |
| 8,302,324 B1 * | 11/2012 | Connelly | A45D 20/12 132/118 |
| 8,707,577 B2 * | 4/2014 | Lee | A45D 20/12 132/212 |
| 8,751,049 B2 | 6/2014 | Linder et al. | |
| 8,893,400 B2 * | 11/2014 | Carme | A45D 20/12 132/115 |
| 9,241,556 B2 * | 1/2016 | Lee | A45D 20/12 |
| 2008/0016712 A1 | 1/2008 | Van | |
| 2010/0012344 A1 | 1/2010 | Dannenberg et al. | |
| 2012/0071891 A1 | 3/2012 | Itkowitz et al. | |
| 2013/0010207 A1 | 1/2013 | Valik et al. | |

FOREIGN PATENT DOCUMENTS

| | | | |
|---|---|---|---|
| KR | 20070089595 A * | 8/2007 | A45D 1/04 |
| KR | 10-2012-0017223 | 2/2012 | |
| KR | 101345488 B1 * | 12/2013 | |
| WO | WO 2005079620 A1 * | 9/2005 | A45D 1/04 |

* cited by examiner

ROBOTIC HAIR DRYER HOLDER SYSTEM WITH TRACKING

BACKGROUND OF THE INVENTION

1. Field of the Invention

The present invention relates to hair grooming devices, and particularly to a robotic hair dryer holder system with tracking for easy and automatic drying and styling of a user's hair.

2. Description of the Related Art

Grooming and styling of one's hair is a common ritual followed by most in preparation for daily work or a special event. This act can, at times, involve great expenditure of time and effort to perfect a desired look. Conventional grooming methods require some dexterity due to the use of both hands to comb or brush the hair while hair drying at the same time. While most are able to perform these tasks with relative ease, some may be physically impaired or incapable. Certain styling options may also be more effective to achieve the desired look by combing the hair with one's fingers, followed by an actual comb or brush, which is almost impossible while manually holding the hair dryer at the same time.

In light of the above, it would be a benefit in the art of personal grooming to provide a device that renders such activities as hair drying, brushing, combing, and related tasks relatively convenient and easy for the user. Thus, a robotic hair dryer holder system with tracking solving the aforementioned problems is desired.

SUMMARY OF THE INVENTION

The robotic hair dryer holder system with tracking includes a robotic arm mounted to a base and a brush. The base mounts to a surface of a desired location for placement of the robotic arm. The robotic arm includes a plurality of articulating members that rotate and pivot with respect to each other. A hair dryer holder is attached to a distal end of the robotic arm and includes a motion sensor. The hair dryer holder selectively holds a hair dryer, and the motion sensor tracks a sensing element on the brush, causing the robotic arm to follow movements of the brush to dry a user's hair.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
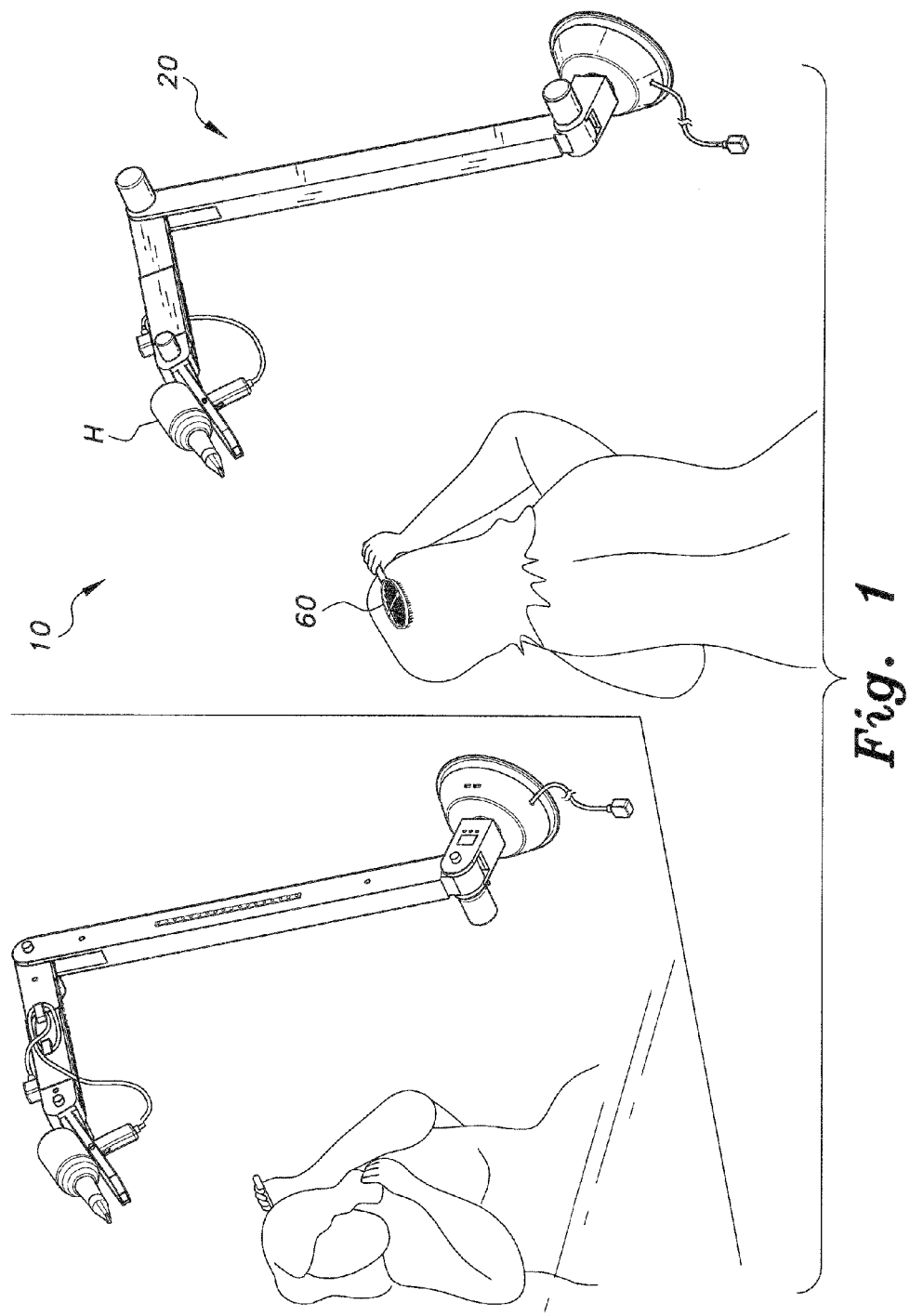
FIG. 1 is an environmental, perspective view of a robotic hair dryer holder system with tracking according to the present invention.

The robotic hair dryer holder system with tracking, the system being generally referred to by the reference number 10 in the Figures, provides a convenient means of drying and styling a user's hair while freeing one of the user's hands for additional styling options or other activities. This is especially convenient for those who are physically incapable of manually brushing and drying their hair in a normal manner. The robotic hair dryer holder system 10 includes an articulated robotic arm 20 having a hair dryer holder 50 at a distal end of the robotic arm 20. The robotic hair dryer holder system 10 is provided with a hair brush 60, and the robotic arm 20 automatically tracks movements of the hair brush 60 during use.

Figure 2:
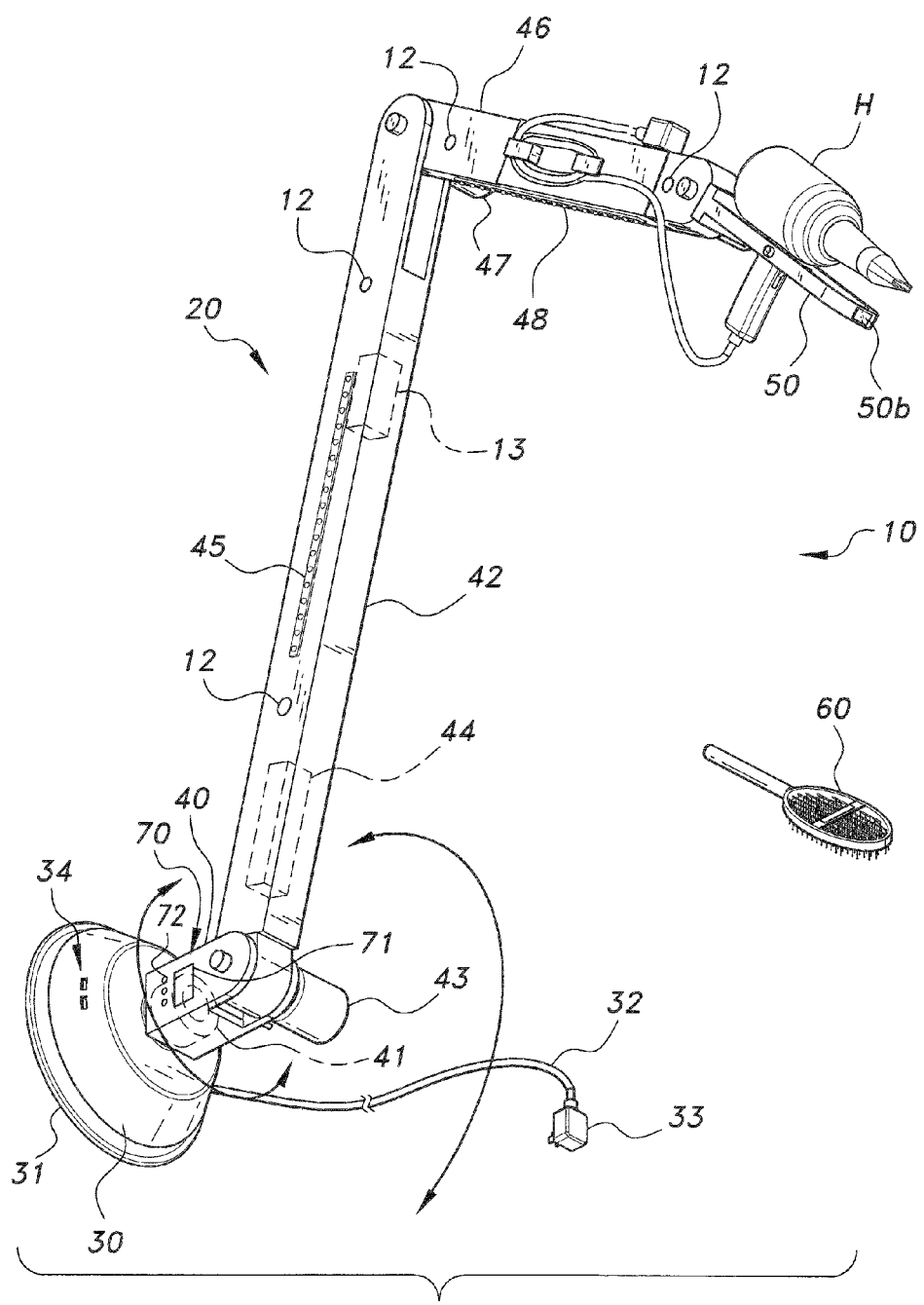
FIG. 2 is a perspective view of the robotic hair dryer holder system of FIG. 1.
Figure 3:
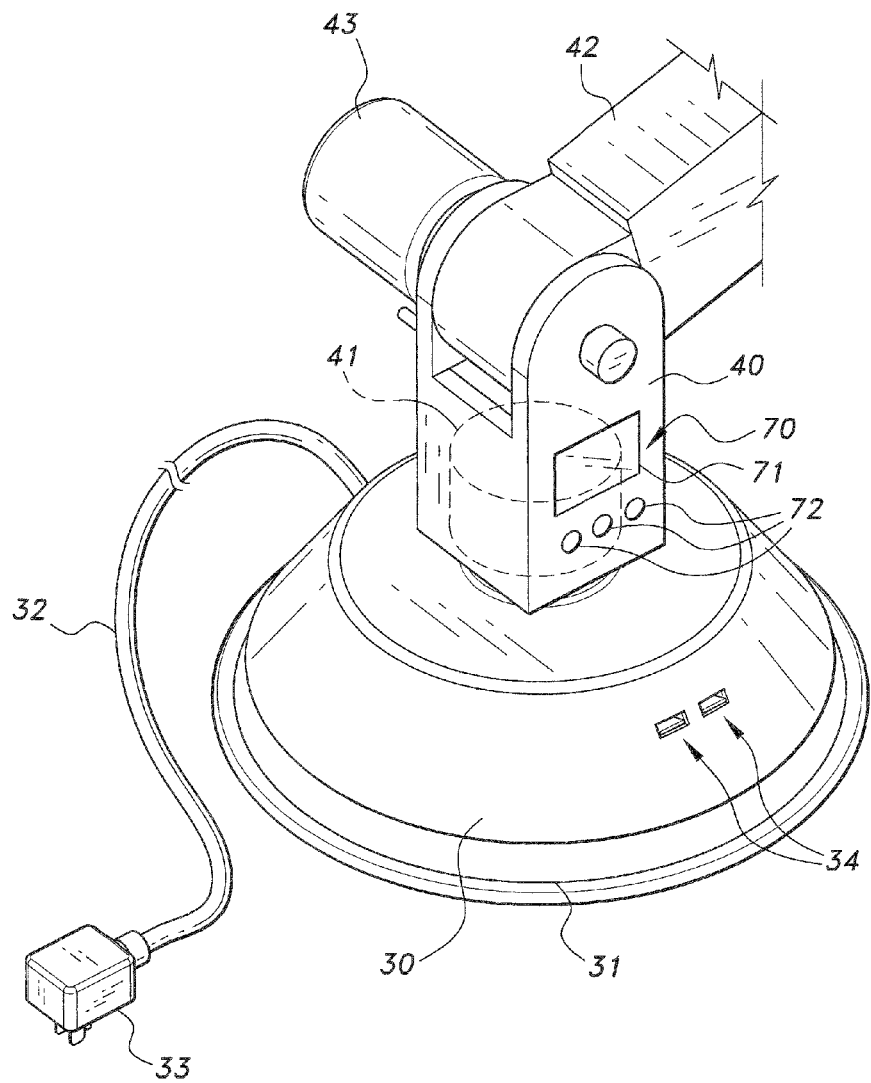
FIG. 3 is a partial perspective view of the base section of the robotic hair dryer holder system of FIG. 1, showing details thereof.

As best seen in FIGS. 1-3, the robotic arm 20 includes a base 30 for selective mounting to a surface. A suction cup 31 is preferably mounted to the base 30 to facilitate mounting of the robotic arm 20 onto a desired surface, for example a mirror, a wall, etc. Other types of mounting means, such as fasteners and the like, can also be used to mount the robotic arm 20. The power to operate the robotic arm 20 is provided by a power cord 32 and plug 33 assembly extending from the base 30. The plug 33 permits the robotic hair dryer holder system 10 to be connected to most conventional power outlet sockets, and the specific configuration thereof may be varied to conform to different international standards. The base 30 may also be provided with one or more charging ports, such as USB (universal serial bus) ports 34, to charge many of the current electronic devices, such as smartphones, tablets, laptops, wireless speakers, and the like. The charging ports 34 also permit simultaneous operation of the electronic device while charging.

The robotic arm 20 also includes a plurality of articulating members that facilitate automatic positioning of a hair dryer H. As best seen in FIGS. 1-5, the plurality of articulating members include an elongate, rotatable first articulating member 40 extending from the base 30; an elongate, second articulating member 42 pivotally attached to the first articulating member 40; and an elongate, third articulating member 46 pivotally attached to the second articulating member 42.

The first articulating member 40 is preferably a relatively short square or rectangular tubing stub to house operational components therein. The first articulating member 40 extends perpendicularly with respect to the base 30, thereby defining an axis of rotation. A motor, e.g., a servomotor 41, is disposed inside the first articulating member 40 to facilitate automatic or automated rotation of the first articulating member 40 about this axis. Other types of motors include stepper motors and the like. The servomotor 41 preferably permits a full 360° rotation of the first articulating member 40 to position the mounted hair dryer H at any desired position.

The second articulating member 42 is preferably an elongate square or rectangular, tubular beam having one end pivotally mounted to the first articulating member 40. A motor, e.g., a servomotor 43, is operatively connected to this end of the second articulating member 42 to facilitate automatic or automated pivoting of the second articulating member 42 with respect to the first articulating member 40. An exemplary desired range of movement for the second articulating member 42 is about 180°. A battery-inverter module 44 may be housed within the second articulating member 42 to output power and control various motors within the robotic arm 20.

The second articulating member 42 may also be provided with an illuminating strip 45, such as a row of LEDs (light emitting diode), to provide illumination onto a desired area during operation.

Figure 4:
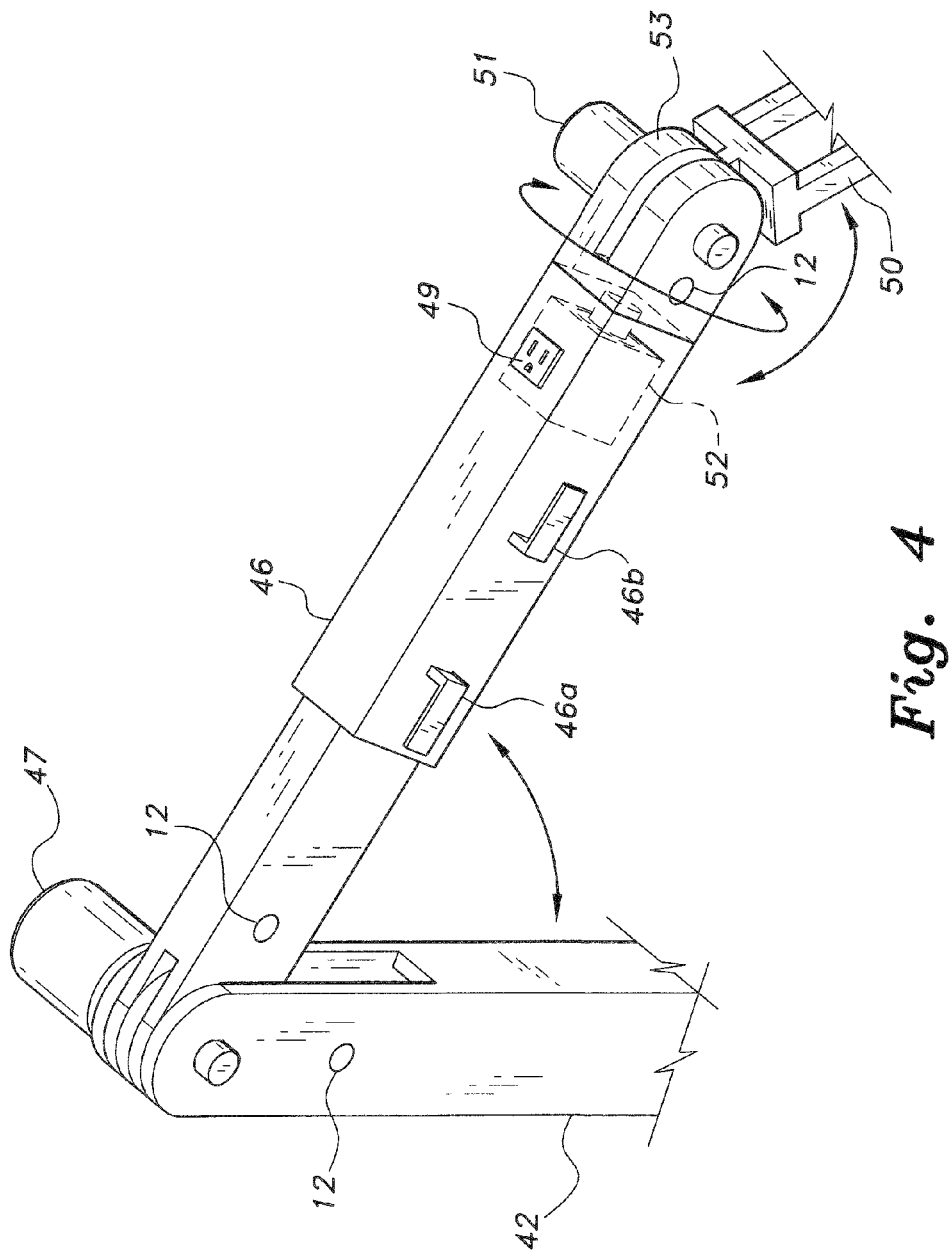
FIG. 4 is a partial perspective view of the robotic hair dryer holder system of FIG. 1, showing details of a wire management system on an arm member thereof.
Figure 5:
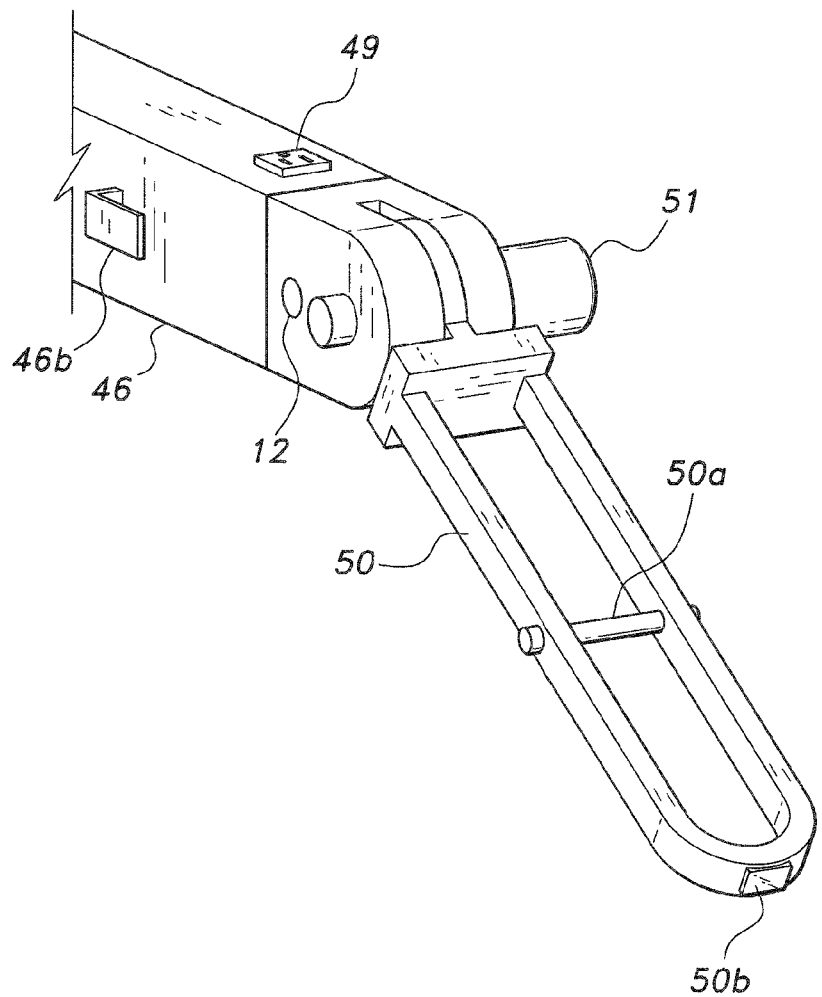
FIG. 5 is a partial perspective view of the robotic hair dryer holder system of FIG. 1, showing details of a hair dryer mount.
Figure 6:
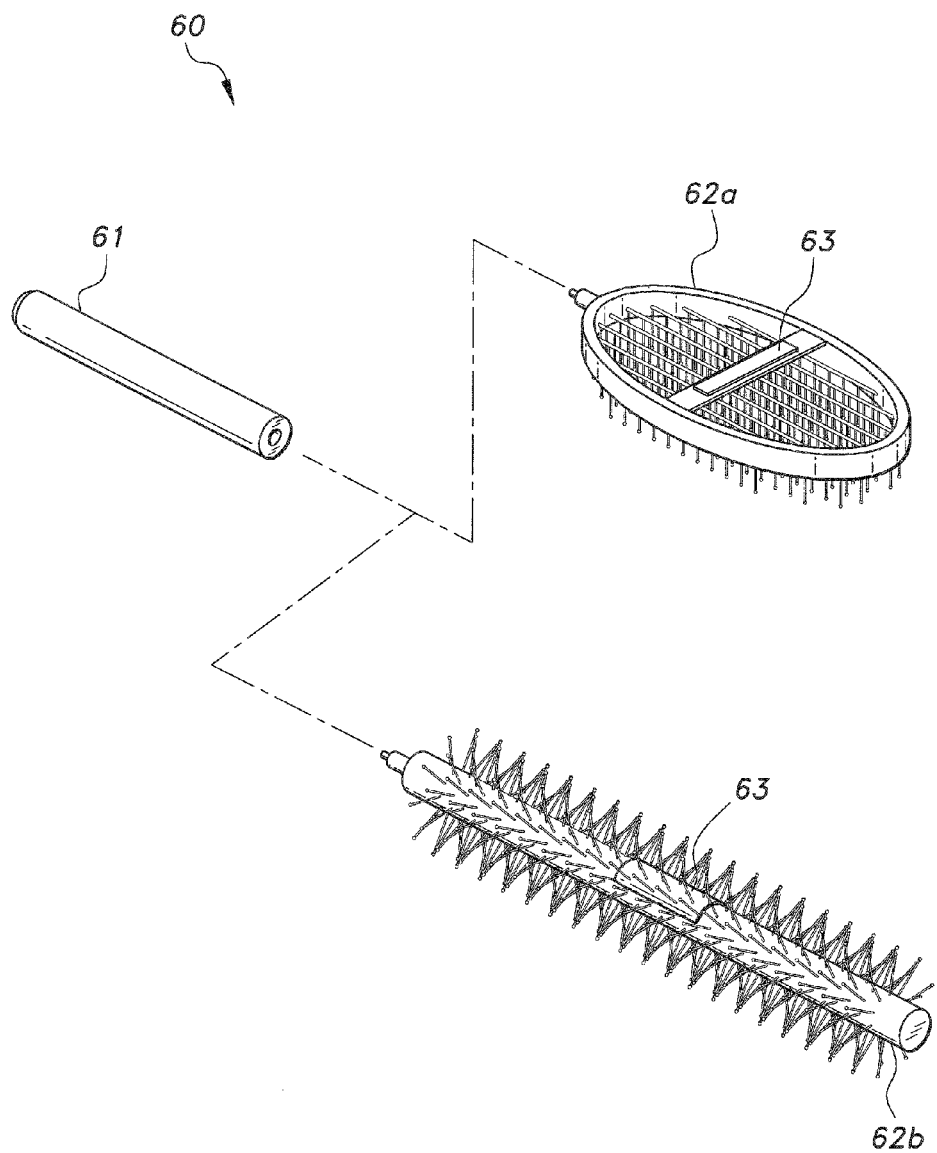
FIG. 6 is an exploded perspective view of a kit of interchangeable brushes provided with the robotic hair dryer holder system of FIG. 1.

As best seen in FIGS. 1, 2, and 4, the third articulating member 46 is preferably an elongate square or rectangular, tubular beam having one end pivotally mounted to the opposite end of the second articulating member 42. A motor, e.g., a servomotor 47, is operatively connected to this end of the third articulating member 46 to facilitate automatic or automated pivoting of the third articulating member 46 with respect to the second articulating member 42. Similar to the servomotor 43 of the second articulating member 42, an exemplary desired range of movement for the third articulating member 46 is about 180°.

The third articulating member 46 is also provided with additional features for a clean, tangle-free mounting of the hair dryer H and illumination. For example, the third articulating member 46 includes wire management hooks 46a, 46b formed on one side of the third articulating member 46. These wire management hooks 46a, 46b allow the user to wind the cord of the hairdryer H to prevent entanglement thereof. An electrical outlet or receptacle 49 is disposed on another side of the third articulating member 46 for a plug of the hair dryer H. The wire management hooks 46a, 46b and the electrical receptacle 49 permit the user to plug the hair dryer H directly into the robotic arm 20 rather than a separate outlet and draw the necessary power for operation.

While the various servomotors enable movement of the articulating members with respect to each other, these movements must be controlled so that they do not interfere or collide with each other. Thus, at least the second articulating member 42 and the third articulating member 46 include a pair of spaced limit sensors 12 connected to a gyroscope 13 to control the movements of the articulating members, maintain a degree of balance to the robotic arm 20, and prevent collisions.

As best seen in FIGS. 1, 2, 4, and 5, the hair dryer holder 50 is mounted on the opposite end of the third articulating member 46. The hair dryer holder 50 is preferably an elongate, U-shaped frame having a cross member or pin 50a disposed about midway thereof. The cross member 50a divides the opening of the frame into two sections, with one section (an opening section proximal to the third articulating member 46) configured to receive the handle of the hair dryer H. The other opening section and the cross member 50a stably support the nozzle portion of the hair dryer H. The distal end of the hair dryer holder 50 is provided with a motion detector 50b that operates in conjunction with a sensing element on the brush 60 to automatically follow the motion of the brush 60.

The hair dryer holder 50 is preferably configured to move in two degrees of movement, similar to general movement of the hand. One end (the proximal end) of the hair dryer holder 50 is connected to a clevis 53, and a motor, e.g., a servomotor 52, is operatively connected to the clevis 53 to facilitate full rotation of the clevis 53 about an axis defined by the elongate third articulating member 46. Another motor, e.g., a servomotor 51, is coupled to the proximal end of the hair dryer holder 50 to facilitate pivotal movements of the hair dryer holder 50 about an axis perpendicular to the axis of rotation of the clevis 53. The rotation of the hair dryer holder 50 represents one of the two degrees of movement while the pivoting thereof represents the other degree of movement. The hair dryer holder 50 may also be provided with a moisturizer (not shown) that can spray mist to dampen hair or to straighten wrinkles on laundry.

To enable automated movements of the robotic arm 20 and the hair dryer holder 50 thereon, the brush 60 includes the sensing element 63. The brush 60 is preferably an interchangeable brush, having an elongate handle 61 and one or more detachable brush heads 62a, 62b. For example, the detachable brush head 62a is a normal oval brush head for simple brushing, while the detachable brush head 62b is a curling brush head for curling the user's hair with the hair dryer H. Each interchangeable and detachable brush head 62a, 62b is provided with the sensing element 63 thereon. The sensing element 63 may also be a wearable object, such as a bracelet, ring, or the like. A wearable sensing element 63 may be used to dry clothing or mild ironing.

In use, the motion detector 50b detects the sensing element 63 on the brush 60 and tracks the movements thereof, causing the robotic arm 20 to move in response to the movements of the brush 60. These synergistic movements between the brush 60 and the hair dryer holder 50 insure that the drying air is directed in the general area of the brush. To maximize hair exposure to drying heat, the brush head 62a is preferably open-back to allow the blowing air to pass through.

Operation of the robotic hair dryer holder system 10 is controlled by a control panel 70. The user can program operations (such as drying and moisturizing) and the duration of each. The control panel 70 includes a screen 71 for display and buttons 72 to input commands. Besides displaying the command options, the display may be used as a timer, clock, and alarm. The control panel 70 can also include a microphone and a headset socket (not shown) for operation via voice commands. The control panel 70 may be connected to a microcontroller, which receives signals (either by wired connection or wirelessly) from the motion detector 50b regarding the movement of the brush 60 and generates signals actuating the various servomotors to reposition the robotic arm 20 and hair dryer holder 50 to track movement of the brush 60.

It is to be understood that the present invention is not limited to the embodiments described above, but encompasses any and all embodiments within the scope of the following claims.

I claim:

1. A robotic hair dryer holder system with tracking, comprising:
   a base adapted for mounting onto a support surface;
   an articulated robotic arm rotatably attached to the base, the robotic arm having a proximal end and a distal end;
   a hair dryer holder extending from the distal end of the robotic arm, the hair dryer holder being adapted for selectively mounting a hair dryer thereto, the hair dryer holder having a motion detector mounted thereon; and
   a brush for grooming, the brush having a sensor element mounted thereon, the motion detector and the brush-mounted sensor element being configured for tracking movement of the brush relative to the distal end of the robotic arm.

2. The robotic hair dryer holder system with tracking according to claim 1, wherein said base comprises a suction cup for selectively mounting said robotic arm to the support surface.

3. The robotic hair dryer holder system with tracking according to claim 1, wherein said base further comprises at least one charging port for electronic devices.

4. The robotic hair dryer holder system with tracking according to claim 3, wherein said at least one charging port comprises at least one USB port.

5. The robotic hair dryer holder system with tracking according to claim 1, wherein said robotic arm comprises:

a first articulating member at the proximal end of said robotic arm, the proximal end being rotatably attached to said base;

an elongate second articulating member, the second articulating member having a first end and a second end, the first end being pivotally mounted to the first articulating member; and an elongate third articulating member having a first end and a second end, the first end of the third articulating member being pivotally connected to the second end of the second articulating member.

6. The robotic hair dryer holder system with tracking according to claim 5, further comprising a motor disposed inside said first articulating member, the motor being mounted on said base and operatively connected to said first articulating member to selectively rotate said first articulating member on said base.

7. The robotic hair dryer holder system with tracking according to claim 6, further comprising a control panel mounted on said first articulating member, said control panel facilitating user input control of said robotic hair dryer holder system.

8. The robotic hair dryer holder system with tracking according to claim 7, wherein said control panel comprises a screen and at least one button.

9. The robotic hair dryer holder system with tracking according to claim 5, wherein said second articulating member comprises:

a motor connected to the first end of said second articulating member, the motor selectively pivoting said second articulating member relative to said first articulating member;

a battery-inverter module disposed inside said second articulating member, the battery-inverter providing power to various motors and controlling movements of said articulating members;

an illuminating strip extending along a side of said second articulating member, the illuminating strip selectively lighting a desired area;

a gyroscope disposed inside said second articulating member; and a pair of spaced limit sensors coupled to the first and second ends of said second articulating member, the limit sensors being operatively coupled to the gyroscope to balance and prevent collision between said articulating members.

10. The robotic hair dryer holder system with tracking according to claim 9, wherein said third articulating member comprises:

a motor connected to the first end of said third articulating member, the motor selectively pivoting said third articulating member relative to said second articulating member;

an illuminating strip extending along a side of said third articulating member, the illuminating strip selectively lighting a desired area; and a pair of spaced limit sensors mounted at the first and second ends of said third articulating member, the limit sensors being operatively connected to the gyroscope in said second articulating member to balance and prevent collision between said articulating members.

11. The robotic hair dryer holder system with tracking according to claim 10, further comprising:

at least one wire management hook disposed on a side of said third articulating member, the at least one wire management hook facilitating winding of a power cord of the hair dryer; and a power receptacle disposed on another side of said third articulating member, the power receptacle being adapted for receiving a power plug of the hair dryer to facilitate direct power connection of the hair dryer to said robotic arm.

12. The robotic hair dryer holder system with tracking according to claim 5, further comprising:

a clevis rotatably mounted on the second end of said third articulating member, said hair dryer holder being pivotally attached to the clevis;

a first motor disposed inside said third articulating member and connected to the clevis, the first motor selectively rotating the clevis on the second end of said third articulating member; and a second motor connected to said hair dryer holder, the second motor selectively pivoting said hair dryer holder on the clevis.

13. The robotic hair dryer holder system with tracking according to claim 1, wherein said brush comprises an elongate handle and a plurality of interchangeable, detachable brush heads, each of the brush heads being selectively attachable to the brush handle.

14. The robotic hair dryer holder system with tracking according to claim 13, wherein said interchangeable, detachable brush heads comprise:

an oval brush head having an open back and said brush-mounted sensor element mounted thereon; and a curling brush head having said brush-mounted sensor element mounted thereon.

* * * * *